Aug. 25, 1931.   D. J. FAHLMAN   1,820,733

MILK CAN AND METHOD OF FORMING SAME

Filed Oct. 29, 1928

INVENTOR
Duncan J. Fahlman
BY
ATTORNEYS

Patented Aug. 25, 1931

1,820,733

UNITED STATES PATENT OFFICE

DUNCAN J. FAHLMAN, OF DETROIT, MICHIGAN, ASSIGNOR TO BUHL STAMPING COMPANY, OF DETROIT, MICHIGAN, A CORPORATION OF MICHIGAN

MILK CAN AND METHOD OF FORMING SAME

Application filed October 29, 1928. Serial No. 315,875.

The invention relates to the manufacture of cans and more particularly milk cans of that type comprising a cylindrical body and a flanged bottom telescopically engaged therewith. It is usual to manufacture and assemble these parts in the black metal and subsequently to subject them to the tinning process. It has been found, however, that in the fluxing operation preparatory to tinning a certain quantity of the acid or flux will penetrate between the cylinder body and flange and will remain permanently. It has also been found impossible to cause the tin or solder to run between the surface of the body and the flange so that sealing is affected only by the inner coating. As a consequence, cans so constructed frequently become leaky and the acid or flux remaining in the joint will work its way inward into the can, contaminating its contents.

Another difficulty in the manufacture of cans, particularly those designed for use as milk cans, is to avoid the formation of a crevice between the bottom and the sides in which dirt may lodge. This crevice is due to the fact that in bending the flange the corner will be curved and thereby form a tapering annular recess. Attempts have been made to cure this defect by the use of an insert between the body and the flange, said insert being fashioned to fill out this tapering space and to leave an unbroken surface. However, such constructions are also defective, particularly in that the flux will penetrate and remain in the joints having the results above described.

The object of the present invention is to avoid these defects, first, by the production of a can in which the surface of both the cylindrical body and the flange are tinned and sweated together. Second, by so constructing the flanged bottom as to avoid the curve at the bend and consequently to eliminate the recess. With these objects in view the invention consists of the construction as hereinafter set forth.

Figure 1:
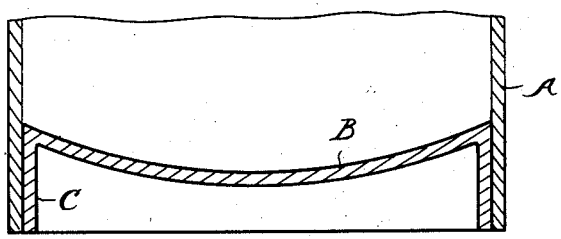
Figure 1 is a longitudinal section through the lower portion of the can showing the flanged bottom and the joint between the same and the cylindrical body.
Figure 2:
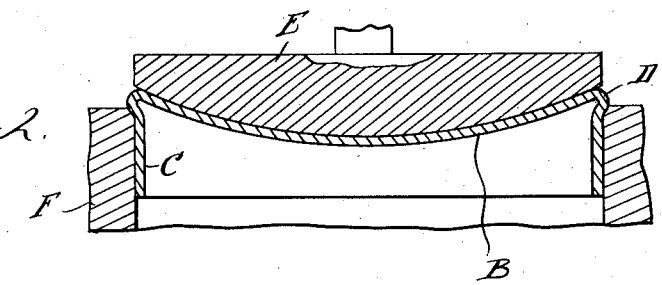
Figures 2 and 3 are sections illustrating the successive steps in forming the flanged bottom to avoid the curve.
Figure 3:
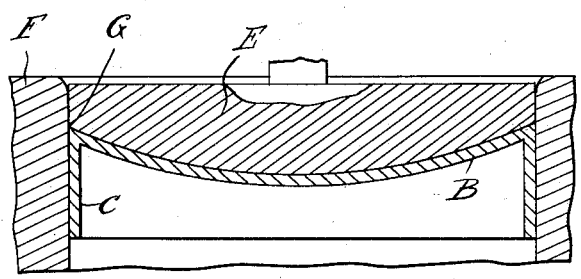

As shown, A represents the cylindrical body of a can, B the bottom member which is of the usual concave form and is provided with a depending cylindrical flange C for telescopically engaging the cylindrical body. To eliminate the curved corner between the bottom and its depending flange, I proceed as follows: The bottom is first pressed to form the flange C with a curve portion D intermediate the same and the bottom B, said curved portion projecting outward beyond the outer surface of the flange as illustrated in Figure 2. The bottom is then engaged with dies E and F, the former fitting the curved bottom surface and the latter surrounding the cylindrical surface of the flange C. The die member F is then moved toward the die member E and in so doing irons down the curve D deflecting the same axially upward and producing a sharp angle corner as indicated at G, Figure 3.

Figure 4:
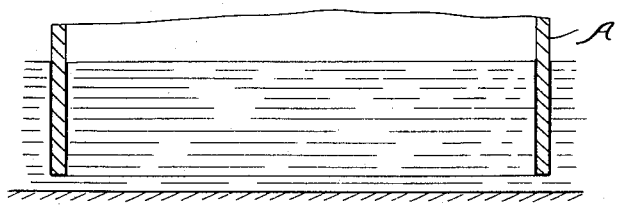
Figure 4 is a view illustrating the step of tinning the portion of the cylindrical body which is to be engaged by the flanged bottom.
Figure 5:
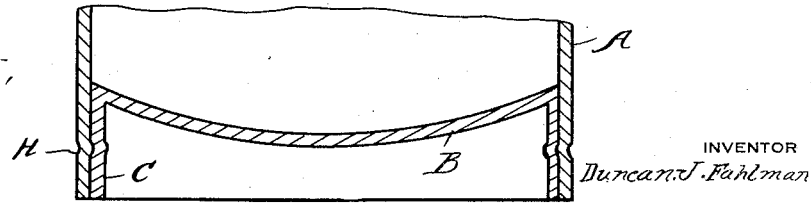
Figure 5 illustrates the manner of engaging the tinned body with the bottom.

After separately forming the bottom and the cylindrical body, the bottom is tinned by immersion in a tinning bath after fluxing, thereby coating the entire surface including that of the flange C. The cylindrical body A is then tinned at its lower portion by immersion in a tinning bath as indicated in Figure 4. This operation not only coats the surface with the tin but also by heating the body expands the diameter thereof so as to give easy clearance for the insertion of the tinned flanged bottom. The parts are then quickly assembled by pressing the hot body over the cool bottom and as soon as the temperature in the two parts equalizes this will form a shrink fit. If desired, the flange may be mechanically locked to the body by one or more indentations as indicated at H, after which the combined structure is subjected to the regular tinning operation which coats all of the exposed surfaces. At the same time this tinning operation by heating up the joint between the body and bottom flange will sweat these parts together forming a perfect seal. As the bottom has the sharp angle corner G there will be no crevice left for the accumulation of dirt and the tinning operation will make a smooth and unbroken surface.

What I claim as my invention is:

1. In the manufacture of cans having a cylindrical body and a bottom provided with a cylindrical flange fitting within said body, the steps of first forming the bottom and the flange with a connecting annular portion rounding radially outward beyond the outside diameter of the flange and of then compressing said annular rounding portion radially inward thereby deflecting the same axially upward to fill up the corner between said bottom and body.

2. In the manufacture of cans having a cylindrical body and a bottom provided with a depending cylindrical flange fitting within said body, the steps of first tinning the bottom and its flange, then tinning the portion of the body which is to engage said flange and while still hot engaging said body with the flange and finally sweating the joint between said body and can to seal the same.

3. In the manufacture of cans having a cylindrical body and a bottom with a depending cylindrical flange fitting within said body, the steps of first tinning the bottom then tinning the portion of the cylindrical body which engages the cylindrical flange and while still hot engaging said body with the flange and then tinning the entire body and simultaneously sweating the joint between said body and flange.

4. In the manufacture of cans having a cylindrical body and a bottom provided with a depending cylindrical flange fitting within said flange, the steps of first forming said bottom and flange with a connecting annular portion rounded radially outward beyond the outer diameter of the flange and then pressing said rounded annular portion radially inward and upward to fill out the corner, tinning the bottom and flange, tinning the portion of the body which is to engage the flange and while hot pressing the same into engagement with the flange to form a shrink fit and then tinning the entire body and simultaneously sweating the joint between the body and flange.

5. A can comprising a cylindrical body, a bottom having a depending cylindrical flange and an integral axially deflected portion completely filling out the corner to avoid a crevice between said bottom and the cylindrical body, said flange and body being sweat soldered and shrunk the one upon the other.

In testimony whereof I affix my signature.

DUNCAN J. FAHLMAN.